June 18, 1968

W. C. CALHOUN 3,388,902

PLATE CUTTING APPARATUS

Filed June 14, 1966

Willie C. Calhoun,
INVENTOR.

BY

June 18, 1968   W. C. CALHOUN   3,388,902
PLATE CUTTING APPARATUS
Filed June 14, 1966   2 Sheets-Sheet 2

Willie C. Calhoun,
INVENTOR.

# United States Patent Office 3,388,902
Patented June 18, 1968

3,388,902
PLATE CUTTING APPARATUS
Willie C. Calhoun, Huntsville, Ala., assignor to the United States of America as represented by the Secretary of the Army
Filed June 14, 1966, Ser. No. 558,219
6 Claims. (Cl. 266—23)

This invention relates to plate cutting apparatus and more particularly to an improved plate cutting apparatus having a high degree of versatility, adjustability, durability, and precision as compared to conventional apparatus. For example, the improved apparatus according to the present invention is particularly useful in fabricating missile and rocket assemblies wherein heavy duty cutting with a high degree of precision is required.

There has long been a demand for a cutting apparatus having the versatility to allow the cutting head to be easily positioned for cutting along straight lines and/or circular lines. The present invention provides such apparatus wherein the support structure for the cutter head may be rotated through 360°, and the cutter head may be additionally moved in a first direction and in a second direction normal to the first direction.

It is, therefore, a primary object of the present invention to provide a plate cutting apparatus which is highly versatile, thereby adapting the cutting head for movement in several different directions.

Another object of the invention is to provide a plate cutting apparatus which is adapted for cutting linear and/ or circular scribe lines.

A further object of the invention is to provide a plate cutting apparatus utilizing a cutting machine adapted for rolling along a track wherein the machine may be set for automatic operation and may be remotely controlled.

A still further object of the invention is to provide a cutting apparatus which will allow a number of different cutting heads and machines to be used interchangeably herewith.

Other objects, features, and advantages will be apparent from the specification and claims and from the accompanying drawings which illustrate a preferred embodiment of the invention.

Figure 1:
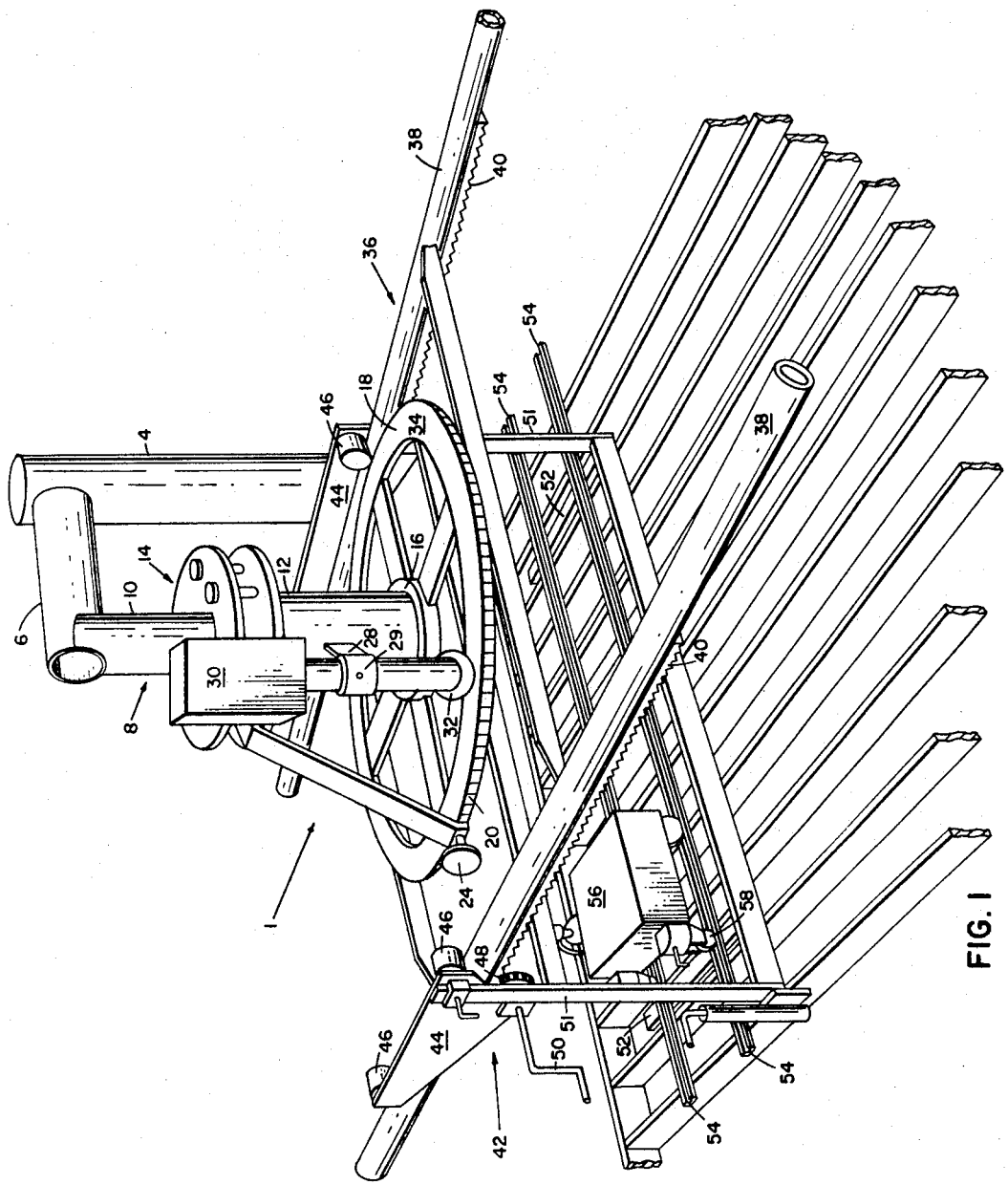
FIGURE 1 is a perspective view of the plate cutting apparatus, partially shown, embodying the features of the invention.
Figure 2:
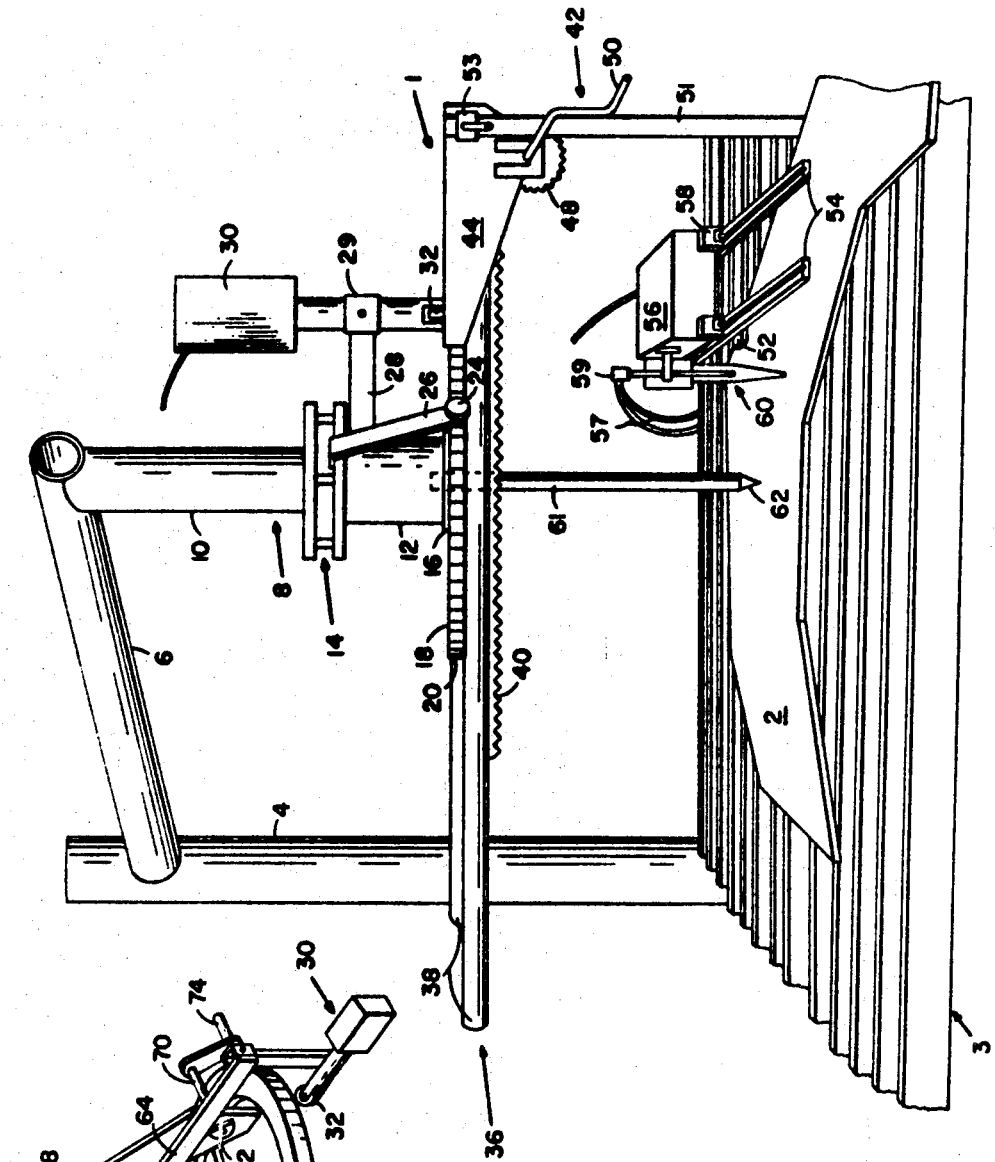
FIGURE 2 is another perspective view of the plate cutting apparatus with portions of the support structure thereof cutaway and with the worktable only partially shown, this view being taken at a different angle from that of FIGURE 1.

Referring to the drawing and particularly FIGURES 1 and 2, there is shown a plate cutting apparatus 1 for cutting a plate 2 (FIGURE 2) supported on a workbed or table 3 (partially shown). The apparatus includes a vertically extending support column 4 rotatably supported at the lower end thereof within a conventional base plate and bearing assembly (not shown). This column is preferably adapted for rotation through 360°. A cantilever beam 6 is rigidly secured at one of its ends to the upper end of the post for disposition above the worktable and in a horizontal plane parallel therewith. A cylindrical centerpost assembly 8 depends from the terminal end of beam 6 in normal relation therewith. Centerpost assembly is formed of two parts: an upper cylindrical element 10 and a lower cylindrical element 12. To provide means for accurately leveling the apparatus carried by lower element 12 with respect to the worktable, a leveling device 14 is interposed within the centerpost structure, i.e., leveling device 14 joins elements 10 and 12. Secured coaxially on the lower end of lower element 12 is an enlarged bearing assembly 16. A ring member 18 is rotatably journaled for support within bearing assembly 16. To lock the ring against rotation, a locking screw 24, carried by bracket 26 extending from the centerpost assembly, engages the outer periphery 20 of the ring. A variable electric drive mechanism 30 is provided to rotate the ring selectively, as by remote control means (not shown). Drive mechanism 30 is supported for vertical adjustment within sleeve 29 of bracket 28 extending from the centerpost and includes a friction wheel 32 for selective engagement with the upper face 34 of the ring.

A first frame 36, secured to the lower side of ring 18, includes a pair of elongated, parallel bars 38 each having a geared track 40 secured on the lower side thereof. A second frame 42, suspended from the first frame, includes a pair of upper frame members 44. Each frame member 44 carries a pair of spaced rollers 46 (FIGURE 1) which engage and roll along the top of one of the elongated bars 38. Rotatably journaled in the lower side of each frame member 44 is a gear wheel 48 meshing with a respective one of the geared tracks 40. At least one of the gear wheels is provided with a crank arm 50 for rotating the same, thereby causing the elongated bars to move telescopingly between the respective rollers and gear wheels. Each frame 42 includes a pair of vertical frame members 51, which are adjustable vertically in sleeves 53. Each frame 42 also includes a pair of lower frame members 52 which support a horizontally disposed track defined by a pair of parallel track members 54. A cutting machine 56, which may be selected from a plurality of different, conventional machines, has a plurality of wheels positioned for rolling along track members 54. Cutting machine 56 is preferably provided with a pair of caster wheels 58 which may be locked to maintain the machine in a selected position as desired. A gas-operated cutting head 60 is operatively supported from the free side of the cutting machine and is connected with a gas source (not shown) as by flexible hoses 57 and coupling 59. A guide rod 61, having a conical end 62, is provided to adapt the apparatus for cutting a circular scribe line, and the same may be useful to aid in cutting parallel linear lines. Preferably, the guide rod is releasably secured coaxially within the lower element of the centerpost. Thus, the guide rod may be easily inserted and removed as desired and is normally used only when a high degree of precision is required.

In operation, the cutting apparatus is positioned above the worktable—and the plate to be cut—initially by rotating column 4. Thus, it is seen that the cutting apparatus may be swung around the vertical pivot axis of column 4 so as to be used on a number of individual worktables with column 4 in the center thereof. Then, upon releasing lock means 24 from engagement with the periphery of ring member 18, the framework carrying the cutting machine is rotated to the desired position relative to the worktable. Frame 42 may be moved along elongated track bars 38. If a straight line is being cut, the tip of the cutting head is merely placed at one end of the scribe line, and the cutting machine, which may be remotely controlled, moves along the track. For circular cutting, the cutting head is aligned with a circular scribe line, and the center guide rod may be placed at the center of the circle. After the locking screw is released from locking engagement with the ring, drive mechanism 30, with friction wheel 32 engaging face 34 of ring 18, is started, thereby causing rotation of the ring and the cutting apparatus about the axis of the center rod guide.

Figure 3:
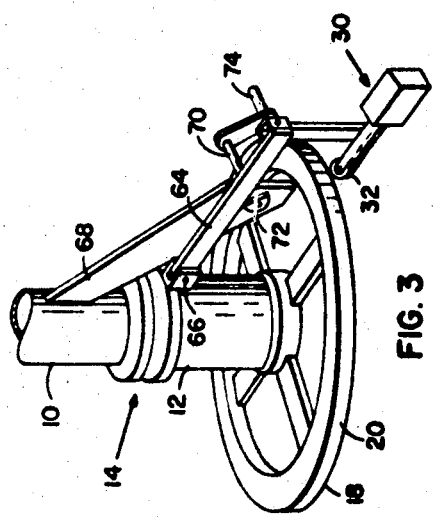
FIGURE 3 is a partial view of another embodiment of the invention, illustrating a modified drive arrangement for the ring.

The embodiment of FIGURE 3 differes only from the apparatus of FIGURES 1 and 2 in that drive mechanism 30 is mounted horizontally so as to allow the friction wheel to be selectively engaged with the outer periphery of ring 18. Thus, mechanism 30 is supported by a bracket 64 pivoted at 66 on element 12. To provide means for selectively moving the drive mechanism into driving engagement with the ring, a shaft 70 having an eccentric 72 and a handle 74 is journaled in the lower end of a bracket 68 rigid with cylindrical element 10. Therefore, in operation, to move the drive mechanism from the inoperative position depicted (FIGURE 3) to the operative position, the eccentric is rotated clockwise by handle 74. Thus, the lower side of bracket member 74 then rests on the flat side of eccentric 72 and friction wheel 32 is in driving engagement with the periphery of the ring.

While the apparatus has been described, in its preferred embodiment, as interchangeably utilizing a cutting machine of a number of conventional designs each having a gas-operated cutting head, the structure lends itself to use with other types of cutting torches by merely securing the same to the cutting machine track. Further, while the apparatus has been described as a plate cutting apparatus, it should be obvious that the apparatus is equally useful in cutting other structures placed on the worktable. For example, the apparatus has been particularly useful in fabricating missile and rocket assemblies, such as thrust rings, motor heads, and adapter rings.

It is to be understood that the invention is not limited to the specific embodiments herein illustrated and described but may be used in other ways without departure from its spirit as defined by the following claims.

What is claimed is:

1. An apparatus for cutting a metal plate supported on a metal-working table comprising, in combination: a vertical column supported at its lower end for rotation through 360° about its vertical axis; a cantilever beam projecting from the upper end of said column and disposed horizontally; a cylindrical arm member depending vertically from the terminal end of said beam and disposed in spaced parallel relation with said column; a ring member disposed coaxially of said cylindrical arm member and supported by the lower end thereof for rotation through 360° about the axis thereof; a rotary drive mechanism supported by said cylindrical arm member and having means adapted for engagement with an annular portion of said ring for rotating the same; a first frame rigidly secured to the lower side of said ring member and disposed in a horizontal plane normal to the axis of said arm, said first frame including a pair of elongated bars disposed in spaced, parallel relation and defining a first track extending in a first direction; a second frame suspended from said first frame and carrying a second elongated track disposed horizontally below said first track in spaced relation therewith and extending in a second direction transversely of said first direction; and a gas-operated cutting means supported on said second track.

2. An apparatus as defined in claim 1 wherein said second frame is provided at its upper end with means for engaging said first track whereby said second track and said cutting means supported thereon may be moved in said first direction beneath said first track.

3. An apparatus as defined in claim 1 wherein said gas-operated cutting means includes a cutting machine provided with rollers for rolling along said second track in said second direction and having a cutting head affixed thereto.

4. An apparatus as defined in claim 1 wherein leveling means is provided intermediate said ring member and said cantilever beam for leveling said ring member and both said tracks relative to the metal-working table.

5. An apparatus as defined in claim 1 wherein a center guide rod, conically formed on its lower end, is secured coaxially within said cylindrical arm for extending vertically into engagement at said lower end with said metal plate whereby said second track and said cutting machine may be guided by said center guide rod for movement in a circular cutting path.

6. An apparatus as defined in claim 1 wherein said drive mechanism includes a variable speed electric motor having a friction drive wheel mounted on said arm and adapted for movement between respective positions whereby the friction drive wheel may be selectively moved into and out of engagement with an annular portion of said ring.

References Cited

UNITED STATES PATENTS 2,548,302  4/1951  Gilson _____ 33—26

FOREIGN PATENTS 21,932  9/1961  Germany.

J. SPENCER OVERHOLSER, *Primary Examiner.*

R. D. BALDWIN, *Assistant Examiner.*